Dec. 22, 1953 F. A. CRAIG 2,663,154
METHOD AND APPARATUS FOR HANDLING FERMENTATION GAS
Filed July 19, 1951 3 Sheets-Sheet 3
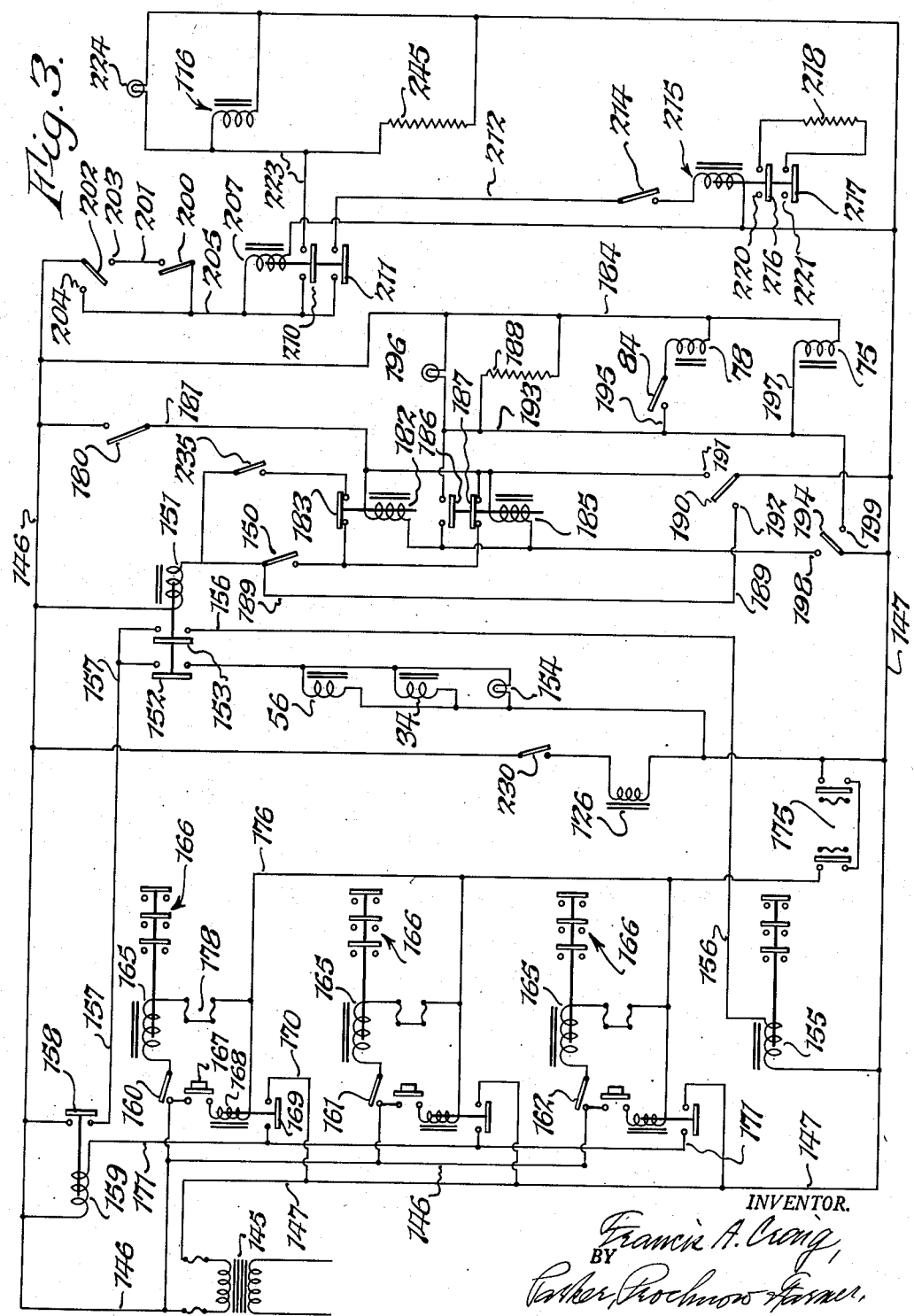
INVENTOR.
Francis A. Craig,
BY
Parker, Brochmore Farmer.
Attorneys.

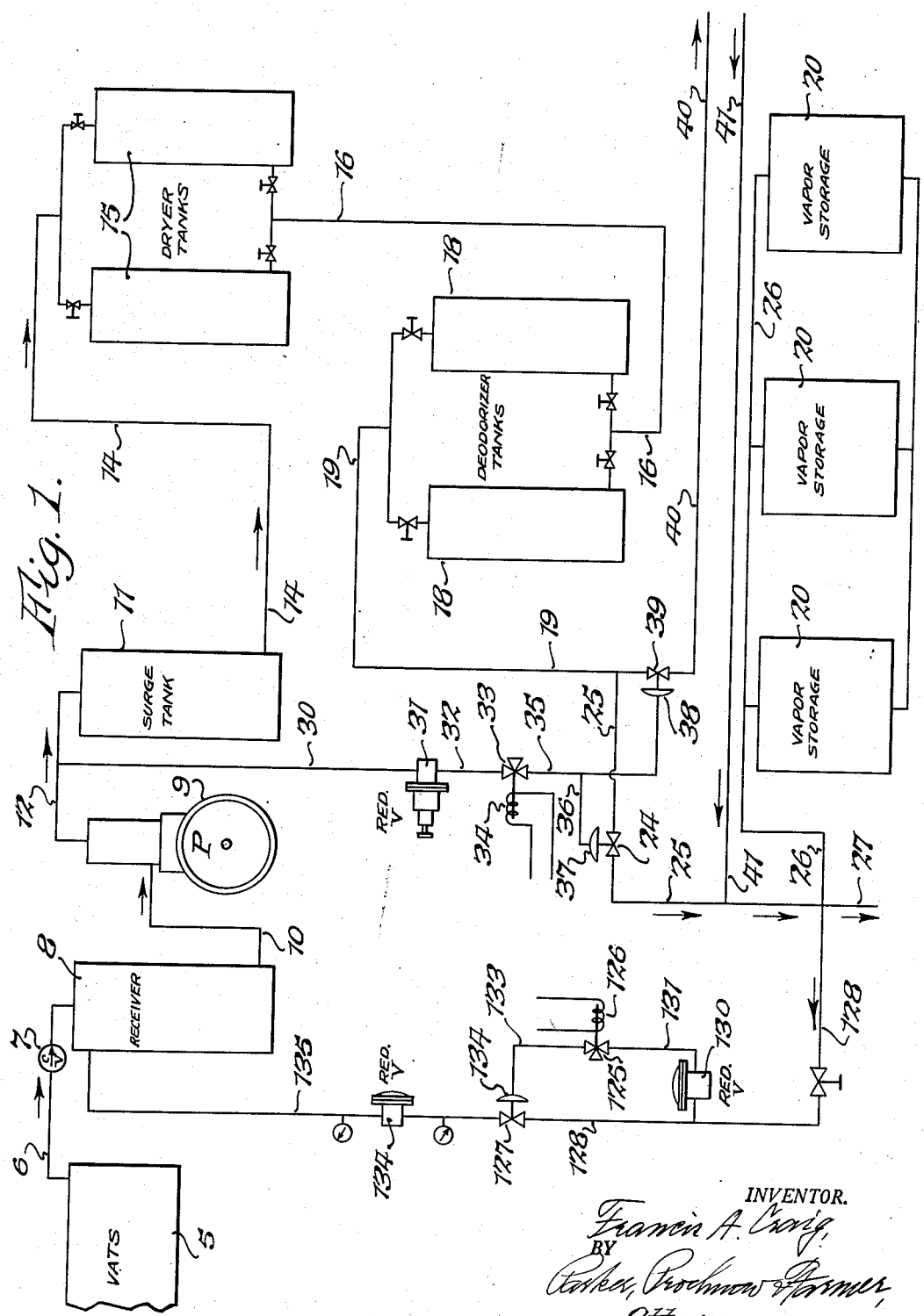

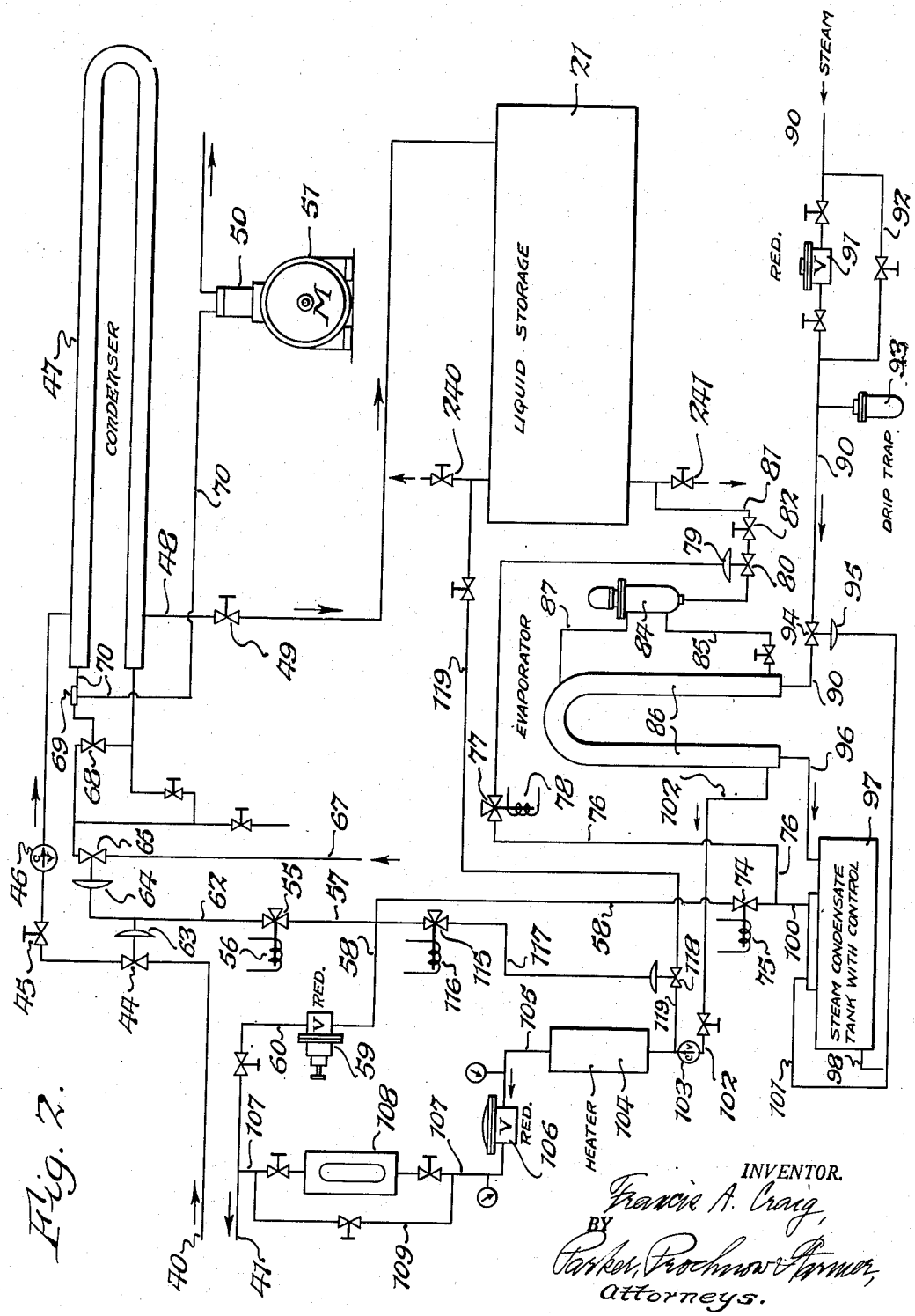

Patented Dec. 22, 1953

2,663,154

UNITED STATES PATENT OFFICE 2,663,154

METHOD AND APPARATUS FOR HANDLING FERMENTATION GAS

Francis A. Craig, Snyder, N. Y., assignor to The Wittemann Company, Incorporated, Buffalo, N. Y.

Application July 19, 1951, Serial No. 237,635

18 Claims. (Cl. 62—1)

1

This invention relates to apparatus by means of which fermentation gases as they are received from a fermenter are compressed and stored for use in vapor and liquid phases.

In places, such for example as breweries, where fermentation gases are evolved and used in connection with the handling of the product, the quantity of fermentation gas produced may vary greatly from day to day, and also the consumption of such gases for various purposes may vary, so that at times when large quantities of gas are produced, only small quantities may be used, and vice versa. It is, therefore, necessary to provide means for the storing of gas in relatively large quantities at times, and heretofore this fermentation gas has been stored in liquid form in which it occupies very much less space than in the gaseous form. This liquefied gas was then vaporized as required.

One of the objects of this invention is to provide an efficient and economical method and apparatus for holding fermentation gas in such a manner that a constant supply of gas in vapor form is available at all times.

Another object is to provide a method and apparatus by means of which only such gas as is not required for use in vapor form is liquefied.

A further object is to provide apparatus of this type which is entirely automatic in operation.

A further object is to provide apparatus by means of which liquefied fermentation gas is vaporized automatically and supplied to a vapor storage tank when pressure in the latter falls below a predetermined minimum.

Another object is to provide apparatus whereby liquid fermentation gas may be automatically vaporized and supplied to a vapor storage tank even while the gas is being supplied thereto from a compressor, in the event that the pressure in the vapor storage tank becomes low.

A further object is to provide apparatus whereby if the pressure in the liquid receiver becomes excessive, gas from the head space in the liquid receiver is recirculated through the apparatus and again liquefied.

Another object is to provide apparatus by means of which the pressure in the liquid gas receiver is increased automatically if it falls below a certain point by adding additional liquefied fermentation gas thereto.

Another object is to provide apparatus of this type including a plurality of fermentation gas compressors which are connected with a refrigerant compressor in such manner that if the apparatus calls for liquefaction of fermentation

2 gas, the refrigerant compressor will operate in conjunction with any of the fermentation gas compressors.

A further object is to provide apparatus of this type with improved means for evaporating liquid fermentation gas.

Other objects and advantages will be apparent from the following description of one embodiment of the invention and the novel features will be particularly pointed out hereinafter in connection with the appended claims.

In the accompanying drawings:

Fig. 1 is a diagrammatic view of a part of a fermentation gas handling apparatus embodying this invention.

Fig. 2 is a diagrammatic view of the remaining part of the apparatus.

Fig. 3 is a diagrammatic view showing the electrical connections between the various parts of the apparatus.

In the particular embodiment of the invention illustrated by way of example in the drawings, I have shown diagrammatically in Fig. 1 one of a series of fermentation vats 5 in which the fermentation gas is evolved and which is connected by means of a conduit 6 including a check valve 7 with a receiver 8 in which the fermentation gas from the vat or vats is collected at low pressure, slightly above that of the atmosphere. 9 represents a compressor for the fermentation gas and which is connected with the receiver 8 by means of an inlet pipe 10. While only one compressor is shown in Fig. 1, it will be understood that any desired number of compressors may be employed, depending upon the quantity of fermentation gas to be handled. These compressors may be of any suitable kind and are preferably of a type heretofore used in breweries for compressing carbon dioxide fermentation gas without excessive rise in temperature during compression.

The compressed gas is discharged from the compressor or compressors into a receiver or surge tank 11 through a suitable pipe or conduit 12. In this receiver some of the entrained free moisture in the fermentation gas is collected and some of the water vapor is condensed and retained for periodic removal. Since the compressed fermentation gas contains a certain amount of water vapor which is not condensed in the surge tank 11 and which would interfere with the liquefying and storage of the fermentation gas, the compressed gas from the surge tank 11 is passed by means of a conduit 14 through suitable means for removing water vapor therefrom, and by way of example, I have shown a pair of drier towers 15 suitably connected with the conduit 14 so that the compressed fermentation gas may be supplied to either of the drier towers. The drying towers may be of any usual construction, and are, therefore, not described in detail. The drying medium contained in these towers may be of the desiccant type and must be treated from time to time to remove water therefrom. This is preferably done manually at intervals and the valves shown are operated manually so that when material in one tower is being dried, the other tower may be kept in operation. The compressed fermentation gas is discharged from the driers at a very low moisture content through a pipe 16 which may, if desired, lead to another pair of towers 18 containing material for deodorizing the fermentation gas. The discharge of gas from the pipe 16 to either one of these towers may be effected by means of manually operated valves at the inlet and discharge ends of the tanks for the same reason specified in connection with the drier tower 15, so that the material in one tower may be re-activated while the other tower is in use. The deodorized gas from either of these towers passes into a pipe 19. The deodorizing towers may contain activated carbon or other material capable of removing odors from the gas and this material may be re-activated as is well known in the art.

The compressed gas in the pipe 19 is now ready for use in a brewery or other establishment in which the apparatus is installed and may be delivered from this pipe either to a series of vapor storage tanks 20 or it may be liquefied and collected in a liquid storage tank 21, Fig. 2.

My improved apparatus is designed primarily to maintain a constant supply of fermentation gas in vapor phase to the vapor storage tanks 20 within a predetermined range of pressures so as to be available for use at all times. If the pressure in the vapor storage tanks reaches the low point of a predetermined range, then fermentation gas from the pipe 19 is supplied directly to the vapor storage tanks. When sufficient fermentation gas has been supplied to the vapor storage tanks so that the pressure of gas therein reaches the upper limit of the predetermined pressure range, then additional gas from the pipe 19 is conducted to the liquefaction cycle and discharged in liquid form into the liquid storage container 21. If at any time the quantity of gas withdrawn from the vapor storage tanks exceeds the amount of gas which can be supplied to these tanks from the pipe 10, then fermentation gas in liquid form is evaporated into the vapor phase and supplied to the vapor storage tanks 20 to maintain a constant supply and pressure in these tanks, so that at any time when gas is required for use, a dependable and adequate supply is available. By means of the apparatus shown, all of this is accomplished automatically. The apparatus is also so constructed that all available gas from the fermenters is collected and stored either in the vapor or liquid phase within the range of the compressor capacities. Consequently, waste of fermentation gas is avoided and the collection of the same is not dependent upon the human element.

The storage of fermentation gas in the apparatus shown, consequently, falls within four basic cycles:

1. The collection and storage of fermentation gas in the vapor storage tanks.

2. The liquefaction of excess fermentation gas collected and compressed by the compressor or compressors 9.

3. The evaporation of liquid fermentation gas and return of the same to the vapor storage tanks.

4. The blow-off or relief of pressure in the liquid storage tank, if it exceeds a maximum predetermined pressure.

These four phases are all interconnected and operate according to the basic requirements imposed upon the system and are controlled from a central point.

*Collection of gas in vapor storage*

Referring again to Fig. 1, 24 represents a valve which is opened when the pressure in the vapor storage tank reaches a low point in its range of pressures. This valve is located in a pipe 25 which is connected with the pipe 19 and the valve is connected with another pipe 26 leading to the vapor storage tanks. The discharge of fermentation gas in vapor phase for use in the brewery or other establishment may be through a pipe 27.

A number of valves used in this system may be controlled by an actuating fluid under pressure such, for example, as compressed air. However, since carbon dioxide or fermentation gas is available under pressure, this gas is used in the particular apparatus illustrated for actuating the various valves.

In Fig. 1, I have shown a pipe 30 for such actuating fluid which may, for example, be connected with the pipe 12 leading from the compressor 9. The pipe 30 leads to a reducing valve 31 which reduces the pressure of the actuating gas to that desired, and this lower pressure control or actuating gas passes from the reducing valve through a pipe 32 to a three-way valve 33 which is actuated by a solenoid 34, the electrical connections to which will be hereinafter described. By means of these connections the solenoid 34 becomes energized to open the valve 33 when the pressure in the vapor storage tanks 20 rises to the upper limit of the range of pressures to be maintained in the vapor storage. This three-way valve 33, when moved by the solenoid 34 into open position, admits actuating gas to a pipe 35, and when in closed position discharges the gas from the pipe 35 to the atmosphere. The pipe 35 is connected by means of a branch pipe 36 to a diaphragm 37 which controls the normally open valve 24 to close the same when no pressure acts on the diaphragm 37 thereof. Consequently, when the solenoid 34 is not energized, fermentation gas from the pipe 19 will pass through the pipe 25 to the vapor storage tank or tanks 20, or directly to the pipe 27 for use in the brewery. The pipe 35 also connects with a diaphragm 38 of a valve 39 which is normally closed and is opened when pressure acts on the diaphragm 38.

When sufficient fermentation gas has been supplied to the vapor storage tanks 20 to raise the pressure in the same to a predetermined point, the solenoid 34 is energized to move the valve 33 into a position in which control or actuating gas is supplied to the pipe 35. Consequently, when pressure acts on the diaphragm 38, the valve 39 is opened to permit fermentation gas to pass through the pipe 40 to the liquefaction cycle which is shown in Fig. 2, and at the same time, this pressure closes the normally open valve 24. There is also shown in Figs. 1 and 2 a pipe 41 through which fermentation gas may pass to the pipe 25 and to the vapor storage tanks 20 after liquefied fermentation gas has been again volatilized in response to a demand for fermentation gas in the vapor storage tanks 20 above that which can be supplied directly without being liquefied, and through which fermentation gas may pass to the vapor storage in case the pressure in the liquid storage becomes excessive.

*Liquefaction cycle*

Fermentation gas to be liquefied passes through the pipe 40 past the diaphragm-controlled valve 44, a hand-operated valve 45, and a check valve 46 to a condenser 47. This condenser may be of any suitable or desired type, that shown diagrammatically being of a double pipe, U-tube form, and any desired number of these tubes may be employed. In the construction illustrated, the inner tube of the condenser receives refrigerant and the fermentation gas to be liquefied passes through the space between the two tubes of the condenser and is discharged in liquid form through a pipe 48 and through a hand valve 49 to the liquid storage tank 21.

The refrigerant employed may be of any suitable kind, ammonia being preferred, which may be compressed by means of an ammonia compressor 50 of any suitable type, which may, for example, be driven by an electric motor 51.

My improved apparatus may be operated at any desired pressures, this being particularly the case with reference to the vapor storage tanks 20, which may be operated at any pressure desired in the brewery in which the apparatus is installed. If, for example, the pressure desired in the vapor storage tanks is approximately between 160 and 180 pounds per square inch, then if the pressure in the vapor storage tanks drops to about 160 pounds per square inch, fermentation gas will be supplied thereto. If the pressure in the vapor storage tanks reaches approximately 180 pounds per square inch, then the solenoid 34 will actuate the valves 33, 24 and 39 to transmit additional fermentation gas to the condenser or condensers 47. The fermentation gas compressor 9 is capable of delivering fermentation gas at pressures materially in excess of those required for supplying gas to the vapor storage tanks 20, and in the apparatus described the fermentation gas is preferably liquefied at a pressure of about 250 pounds per square inch. Consequently, by the use of my improved apparatus, any fermentation gas compressor used is capable of delivering fermentation gas either at the pressure required in the vapor storage tanks 20 or for delivering fermentation gas at a higher pressure for liquefaction. If more than one compressor is used, such compressors are connected in parallel relation to each other for taking care of larger capacities, but in my apparatus as shown, no additional compressors are required for boosting the fermentation gas from the vapor storage pressure to a higher pressure for liquefaction.

Assuming that the pressure in the vapor storage tanks has increased to the upper limit of the range of pressures, for example, 180 pounds per square inch, and the compressor or compressors 9 and the refrigerant compressor 50 are operating, a three-way valve 55 will be actuated by means of a solenoid 56, as will be hereinafter explained. This valve is arranged in a conduit 57 connected with a conduit 58 leading from a pressure reducing valve 59 which receives gas through a conduit 60 connected with the pipe 41 which, in turn, is connected through pipe 26 with the vapor storage tanks 20. This reduced control or actuating gas passing to the pipe 57 is discharged by means of the valve 55 into a conduit 62 connected with a diaphragm 63 of the valve 44 and with another diaphragm 64 connected with a valve 65 in the refrigerant line so that both valves 44 and 65 will be opened simultaneously to admit fermentation gas and refrigerant to the condenser 47. For the sake of clarity, the entire refrigerating cycle, including the ammonia compressor 50, is not herein shown in detail, since it may be of any usual or suitable type. Liquid ammonia or other refrigerant from this system passes to the valve 65 through a conduit 67 and flows to an expansion valve 68. This valve is thermally operated in any usual or suitable manner, as by means of a thermostat or temperature responsive device 69, which is responsive to the temperature in the refrigerant discharge pipe 70 leading from the condenser 47 to the intake of the refrigerant compressor 50. By means of this arrangement, the liquefying of the fermentation gas will be automatically controlled by the temperature of the refrigerant discharged from the condenser, and since the pressure in the liquid storage tank 21 will be maintained at approximately 250 pounds, the pressure of the fermentation gas will be automatically increased by the compressor so that it may pass through the check valve 46 and the condenser 47.

*Evaporation cycle*

If, at any time the use of compressed gas from the vapor storage tanks 20 exceeds that which is supplied to these tanks by the compressor 9 so that the pressure in the vapor storage tanks 20 falls below the desired minimum, for example, 160 pounds per square inch, a two-way valve 74 controlled by a solenoid 75 will be opened. This valve is connected with the conduit 58 carrying control or actuating gas. The valve 74 admits control gas through a pipe 76 to a valve 77 actuated by means of a solenoid 78 to the diaphragm 79 of a valve 80, when the valve 77 is open. This valve 80 controls the flow of liquid fermentation gas passing through a pipe 81 and past a hand-operated valve 82 to a level switch 84 and then through conduit 85 to an evaporator 86. The level control valve 84 may be of any suitable or usual construction, and since valves of this kind may be purchased in the open market, no detailed description is deemed necessary. This valve is connected by means of another pipe 87 to the upper portion of the evaporator 86. The liquid fermentation gas will flow through the pipe 85 into the evaporator until it reaches a maximum level, whereupon the level control switch 84 will stop further flow of liquid fermentation gas into the evaporator until the level in the evaporator becomes lower, due to evaporation of the liquid gas therein. The level switch 84 acts through the solenoid 78 and the valve 77 to close the valve 80 when the desired liquid level in the evaporator has been reached, as will be hereinafter explained.

The evaporator 86 for changing the phase of the fermentation gas from liquid to vapor is preferably in the form of an inverted U-shaped heat exchanger mounted in a vertical position with the U bend at the uppermost point. The evaporator has an inner tube through which the heating medium flows. The liquid fermentation gas is admitted into the space between the inner and outer tubes of the evaporator.

Any suitable heating medium may be employed for vaporizing the liquid fermentation gas, and in the construction shown, steam or hot vapor is employed as the heating medium in the evaporator. The steam or other heating medium may be admitted from a suitable source to a tube 90 and if the steam is of relatively high pressure, it is passed first through a reducing valve 91. However, a valve controlled by-pass 92 is provided through which the heating medium may be passed if a reduction valve is not necessary. A drip trap 93 may be provided for receiving condensed steam. The flow of heating medium to the evaporator through pipe 90 is controlled by means of a valve 94 operated by a diaphragm 95 and the pipe 90 terminates in one end of the inner tube of the evaporator. The other end of the inner tube is connected by means of a pipe 96 to a steam condensate tank 97 provided with an outlet 98 for the condensate.

The condensate tank 97 contains a heat responsive device such, for example, as a thermostat which controls the extent to which the steam admission valve 94 is opened to admit the heating medium to the evaporator, in such a manner that if the condensate is of less than a desired temperature, the valve 95 will be opened to a greater extent and if the temperature of the condensate is too high, the valve 95 will move toward closing position to restrict the amount of heating medium supplied to the evaporator. This thermostatic control serves to economize the use of steam or other heating medium and also to prevent the condensate from freezing in the evaporator. The valve 74 admits control gas to a thermostatically controlled valve (not shown) in the condensate tank 97, by means of a pipe 100. 101 represents a discharge pipe for the control of actuating gas from the thermostatically controlled valve in the steam condensate tank 97, this pipe leading to the diaphragm of the valve 94. The thermostatic device within the steam condensate tank varies the amount of control gas which flows through the pipe 101 in such a manner as to regulate the amount of steam passing to the evaporator in accordance with the temperature of the condensate discharged from the evaporator.

The vaporized fermentation gas leaves the evaporator through a pipe 102 and passes through a check valve 103 to a heater 104 which is in the nature of a small heat exchanger which may, for example, contain an electrical resistance heating unit (not shown) for raising the temperature of the vapor, if necessary, to prevent frosting on the pipes conducting the vapor to the vapor storage tanks 20. This electric heating element is preferably connected in the circuit at the same time that the valve 118 is opened. By heating the gas, frosting of the exterior of the pipes 105 and 107, and consequently, dripping of moisture therefrom is avoided. After passing through the heater 104, the vapor passes through the pipe 105 to a pressure reducing valve 106 and then through pipes or conduits 107 to the pipe 41 leading to the vapor storage tanks. If desired, a flow meter 108 may be included in the pipe 107 to indicate the rate of flow of gas from the evaporator to the liquid storage tanks 20, but a valve controlled by-pass 109 is provided in case the flow meter is not to be used.

When the pressure in the vapor storage tanks 20 has increased to the desired extent, for example, to 170 pounds per square inch, the solenoid 75 of the valve 74 will be de-energized, thus closing this valve as well as the valve 94 for the heating medium so that evaporation of liquid fermentation gas is stopped.

*Pressure relief for liquid receiver*

If at any time the pressure of fermentation gas in the liquid storage receiver 21 should increase beyond that desired, for example, 260 pounds per square inch, a three-way valve 115 controlled by a solenoid 116 will be actuated to direct control gas, which may be received from the pipe 57, to a pipe 117 to a diaphragm-actuated valve 118. The valve 118 is in a pipe 119 connected with the head space in the liquid storage receiver, and this pipe connects with pipe 102 leading to the heat exchanger 104. The heating medium in the heater 104 is preferably an electrical resistance thermostatically controlled device so that the vapor will be warmed to the desired extent before passing through the pipes 105 and 107 to the pipe 41. The gas thus discharged from the head of the liquid storage container, after passing through the heater, passes to the valve 106 and through or around the flow meter 108 and through the pipe 41 to the vapor storage tanks.

If the flow of fermentation gas from the liquid storage tank 21 continues sufficiently long, the pressure in the vapor storage tanks 20 can increase until it reaches a point several pounds in excess of the maximum pressure which is normally maintained in the vapor storage tanks. When this occurs, a solenoid-operated valve 125, Fig. 1, is opened by means of its solenoid 126, the circuit through which is closed by means of a pressure controlled switch on the vapor storage tanks set to operate at a pressure in excess of the normal upper limit of pressure desired in the vapor storage tanks. For example, if the range of pressure desired in the vapor storage tanks is 160 to 180 pounds per square inch, this pressure controlled switch may be set, for example, at 182 pounds per square inch.

The valve 125 controls a valve 127 in a pipe 128 which connects with the pipe 26 leading to the vapor storage tanks 20. Control or actuating gas for the valve 125 may be taken from the pipe 128 and passed through a reducing valve 130 to a pipe 131 leading from the valve 125. When this valve is opened, control or actuating gas passes through the pipe 133 to the diaphragm 134 of valve 127, thus opening this valve and permitting gas to flow through the pipe 128 to the pressure-reducing valve 134a, and then through a pipe 135 to the receiver 8. If the compressor 9 is already in operation, the valve 33 will, of course, have been actuated because of the high pressure in the vapor storage tanks to open the valve 39 to pass the compressed gas to the liquefaction apparatus. If the compressor is not operating at the time gas is discharged from pipe 135 into the receiver 8, then increase in pressure in the receiver 8 will start the operation of the compressor 9, as will be hereinafter explained. By means of this arrangement, vapor which might ordinarily be vented to the atmosphere from the liquid receiver through a safety valve, is either put directly to use in the brewery or is put back into the liquid receiver in liquid phase, thereby reducing the pressure therein.

*Low pressure make-up in liquid receiver*

If at any time the pressure in the liquid receiver 21 falls, for example, to approximately 225 pounds per square inch, the liquefying cycle will become operative as previously described, and all vapor from the compressors will be passed through the condenser 41 into the liquid receiver. However, if at any time the pressure in the vapor storage tanks 20 should fall to the minimum of the range of pressure for the vapor storage tanks, the evaporation of liquid fermentation gas would become operative and at the same time the liquefaction cycle initiated by the reduction in pressure at the liquid receiver and the evaporation of liquid fermentation gas would continue until the pressure in the vapor storage tanks 20 has been restored, whereupon the liquefaction operation will again start when the liquefying cycle has been initiated by reduction in pressure at the liquid storage tank 21, liquefaction will continue until the pressure in the liquid storage tank has been increased to approximately 250 pounds per square inch.

Electrical connections

Electric power for operating the system may be received from any suitable source, such as a transformer 145, the secondary terminals of which are connected to two main power lines 146 and 147 which supply the control system, Fig. 3.

The electrical connections shown include a number of pressure controlled switches which are opened and closed by pressure responsive devices in various parts of the apparatus. Since pressure responsive devices which open and close electric circuits in accordance with pressures to which they are exposed are well known and are readily available for purchase, it is not deemed necessary herein to illustrate such pressure responsive devices.

Liquefaction cycle 150 represents a pressure actuated switch which is responsive to pressures in the vapor storage tanks 20, the switch being closed when the pressure reaches the maximum of its range and opened when the pressure reaches a desired minimum. For example, the switch 150 may close at 180 pounds per square inch and open at 170 pounds per square inch. When the switch 150 is closed, current will pass through a coil 151 of a relay which has two sets of movable circuit closing contacts 152 and 153. The movable contact 152 completes a circuit through the coil 56 which actuates the control valve 55 which admits control gas to diaphragm 63 to valve 44 for conducting fermentation gas to the condenser 47, and to diaphragm 64 of the valve 65 which admits refrigerant to this condenser. The circuit closing contact 152 also permits electric current to flow to the solenoid coil 34 which actuates the control valve 33 to shut off the supply of fermentation gas to the vapor storage tanks 20 and admit fermentation gas to the condenser 47. If desired, a pilot light 154 may also be lighted when the movable contact member 152 is in circuit closing position to indicate that the apparatus is operating on the liquefaction cycle. The movable circuit closing contact 153 closes a circuit through a conductor 156 to a solenoid 155 for operating a starter for the motor (not shown) which operates the refrigerant compressor or booster 50.

Current is conducted to the stationary contacts with which the movable contact members 152 and 153 engage by means of a conductor 157 which is connected with the power line 146 by means of a movable contact member 158 which is actuated by a solenoid 159 which is energized only when the motor which drives the fermentation gas compressor is in operation. In other words, the solenoid 159 moves the contact member 158 into circuit closing position only when the compressor 9 for the fermentation gas is in operation, so that the liquefaction cycle cannot be operated except when this compressor is operating.

The operation of the compressor or compressors 9 is dependent upon the closing of another pressure switch responsive to the pressure in the receiver 8 in which the fermentation gas is collected before it passes to the compressor 9. I have illustrated diagrammatically by way of example in Fig. 3, starting mechanisms for three different compressors for the fermentation gas. Any number of these compressors may, of course, be provided, and they may be operated in accordance with the amount of fermentation gas delivered to the receiver 8. For example, if three different compressors are provided, one of these compressors may be automatically started by a pressure switch when there is a pressure of two pounds per square inch in the receiver 8. If the pressure in the receiver 8 reaches three pounds, the second compressor is started and if the pressure in the receiver continues to rise to four pounds, the third compressor will be started by means of another pressure responsive switch. In the construction shown, 160, 161 and 162 represent respectively three switches responsive to pressures in the receiver 8. Since these three switches are all similarly connected, only one of them will be described, but the same reference characters apply to the various connections for the other switches.

When one of the pressure responsive motor starting switches 160, 161 or 162 is closed, a circuit is completed from the power supply line 146 to a solenoid 165 which actuates a motor starter 166 for starting a motor (not shown) which operates a fermentation gas compressor 9. The pressure-responsive motor starting switch also closes a circuit through an auxiliary contact 167 leading to a solenoid 168 which, when energized, moves a movable contact member 169 into engagement with the adjacent terminals. One of these terminals is connected by means of a conductor 170 to the power supply line 147 and the other terminal connects with a conductor 171 which leads to the solenoid 159 and energizes the same to move the movable contact member 158 into switch-closing position so that current may be supplied to the solenoids 56 and 34 and to the solenoid 155 which is connected with the starter for the refrigerant compressor, when the switch 150 is closed. It will thus be seen that if the starting switches for one or more of the motors operating the fermentation gas compressor or compressors is not closed, then there also will be no current flowing through solenoid 159 so that the ammonia compressor will not be operated and no gas will be conducted to the condenser 47.

If, at any time, there should appear in the ammonia compressor starter an increase in current, which might be due to an overload of the motor driving this compressor, means are provided for stopping the operation of the fermentation gas compressors and for preventing the actuation of valves for passing fermentation gas vapor to the condenser 47. In the particular construction shown for this purpose, a heater coil circuit 175 of any usual or suitable type is included in the starter of the motor driving the ammonia compressor. The coil 168 is connected by means of a conductor 176 through the heater coil circuit 175 to the power supply line 147, and consequently, if this heater circuit is broken, due to excessive current supplied to the refrigerant compressor motor, the circuit through the solenoid coil 168 will be broken, thus interrupting the supply of current through conductor 171 to the solenoid coil 159. When this circuit is broken, the supply of current to the solenoids 56 and 34 and to solenoid 155, which starts the ammonia compressor motor, is broken, thus stopping this motor and preventing actuation of valves of the liquefaction system.

Similarly a heater coil circuit 178 is provided in the circuit leading from the solenoid 165 to the conductor 176. Consequently, if only one fermentation gas compressor is operating and the circuit through the heater coil 178 is broken, then the motor driving the fermentation gas compressor will be stopped, since no current will flow through this solenoid coil 165. The heater coil 178 is operatively connected with the auxiliary contact 167, thus moving this contact into open circuit position to interrupt the flow of current to the coil 168. This results in moving the circuit closing member 169 into open circuit position and thus interrupting the flow of current to the solenoid 159, so that no current is supplied to the compressor motor starter nor to the solenoid coils 56 and 34, this making it impossible to operate the liquefaction cycle. If the overheating of either the heater coil 175 for the refrigerant compressor motor or the heater coil 178 of the motor which drives the fermentation gas compressor results while the liquefaction cycle is in operation, then this cycle will be terminated at once, due to interruption of current supply to the solenoid coil 159. By means of this arrangement of parts, the apparatus is adequately protected in the event of motor failure at either the refrigerant gas compressor or the fermentation gas compressor. If more than one fermentation gas compressor is employed, the rise in pressure in the receiver 8 due to stopping of one compressor will cause the next fermentation gas compressor to begin operation so that the apparatus will continue to operate. However, if more than one fermentation gas compressor is operating, when one of the heater coils 178 operates to move its contact member 167 into open circuit position, the other fermentation gas compressors will continue to operate, and also if the switch 150 which places the liquefying cycle into operation is closed, the refrigerant compressor will continue to operate. However, if the heater coil 175 of the refrigerant compressor opens the circuit 176, then the liquefaction cycle will be stopped through coil 159. The fermentation gas compressors may, however, continue to operate to supply fermentation gas to the vapor storage tank or tanks 20.

In the normal operation of the apparatus, the liquefaction cycle, after it has been started, will continue to operate until the pressure in the vapor storage tanks 20 drops to the lower limit of the pressure range for the vapor storage tanks 20, for example, 170 pounds per square inch, at which time the pressure controlled switch 150 will open. When this occurs the supply of electric current to the solenoids 56 and 34 will be interrupted, whereupon the flow of control or actuating gas to the diaphragms 37 and 38 will be interrupted by the valve 33, Fig. 1. Since the valve 39 is direct-acting, it will close when the supply of pressure to the diaphragm 38 is interrupted, and the valve 24 will be opened when the supply of control gas under pressure to its diaphragm 37 is interrupted. The fermentation gas from the pipe 19 will, consequently, be admitted to the vapor storage tanks 20.

*Evaporation cycle*

The control of the evaporation cycle of the apparatus may be effected as follows:

If the pressure in the vapor storage tanks 20 drops to the lowest level of the range of pressures at which gas is to be maintained in these tanks, for example, 160 pounds per square inch, then a pressure-responsive switch 180 will be closed to complete a circuit from the power supply line 146 to a conductor 181, which connects with a solenoid 182 by means of which a movable contact member or switch 183 which is normally in closed position, is moved into circuit-opening position for the purpose hereinafter described. When the switch 180 is closed, current will also flow to a solenoid 185 of a two-pole relay, including circuit closing members or switches 186 and 187. The circuit closing member 186 is normally closed when the relay 185 is not energized and this circuit closing member completes a circuit through the pressure responsive switch 150 and a conductor 189 leading through a manually adjusted selector switch 190 to the power supply line 147. The selector switch 190 is manually operated and when the movable switch member engages the contact 191, the liquefaction system will be operated automatically. If it is desired to operate this system manually the movable switch member 190 is moved into engagement with a contact 192. When the movable switch member 190 is in an intermediate position between the contacts 191 and 192, as shown in Fig. 3, the liquefaction system will not be operable. The movable switch member will, during normal or automatic operation of the apparatus, be left in position to contact with terminal 191. When the pressure switch 180 is actuated because of an excessive drop in pressure in the vapor storage tanks, the switch 150 should be open, since, as described, it opens at a higher pressure than that required to actuate switch 180. By means of the contact member 186, the flow of current through the solenoid coil 151 is interrupted, even in the event that the switch 150 should fail to function, so that the liquefaction cycle will be positively shut down, thus ensuring that the fermentation gas from the compressor will go to the vapor storage tanks.

The circuit closing member 187 is normally in open position, but is closed when the solenoid 185 is energized. When the contact closing member 186 is closed, current will flow from the conductor 181 and through solenoid coil 182 through the switch member 186 to a conductor 193 which leads to another manually operable selector switch 194 similar to the selector switch 190, to the supply line 147.

A branch conductor 195 connects with the conductor 193 and supplies current to the solenoid 78 of the valve 77 which supplies control gas to the diaphragm 79 of the valve 80, thus admitting liquefied gas from the liquid storage tank 21 to the evaporator 86. The conductor 193 also connects with a branch conductor 197 leading to the solenoid 75 which when energized opens valve 74 which admits control gas to the valve 77 for actuating the diaphragm 79 of valve 80. The valve 78 also allows control gas to pass to the control system for the flow of heating medium, such as steam, to the evaporator. Evaporation of the liquefied gas will, consequently, be effected and this evaporation will continue until the vapor storage pressure in the tanks 20 rises to the pressure intermediate of the range of pressures designed to exist in the vapor storage tanks, such for example as a pressure of 170 pounds per square inch. When this pressure is reached, the pressure control switch 180 will open, thus interrupting the liquefaction cycle, and this again will cause the circuit closing member 186 to move into circuit-closing position to enable the pressure controlled switch 159 to become operative when the vapor storage reaches a pressure at the upper limit of its range, for example, 180 pounds per square inch.

When the manually movable switch member 194 is moved into engagement with the contact 198, the liquefaction system will be operated automatically. If it is desired to control this system manually, the movable switch member 194 is moved into engagement with the contact 199. If the switch member 194 is in a position intermediate between the two terminals 198 and 199, the liquefaction system will be inoperative. When the switch member 186 is in its circuit closing position, current will be conducted from the conductor 193 to a conductor 184 through a heating cable 188 which is arranged in operative relation to the valve 80 to prevent the formation of frost about this valve in such a manner as to render it inoperative. Any other means for preventing frosting of this valve may, of course, be provided. 196 represents a signal light which is illuminated to indicate that the evaporation cycle is in progress.

*Pressure relief cycle*

If at any time the pressure in the liquid storage tank 21 increases to a pressure in excess of that at which it is intended to operate, for example, if this pressure increases to 260 pounds per square inch, it becomes necessary to relieve this pressure. When this is done by the ordinary safety or blow off valve, the excess fermentation gas is lost or wasted, and in order to avoid this waste, I have provided in the apparatus means for supplying this gas to the vapor storage tank 20 for immediate use, or, if this raises the pressure excessively in the vapor storage, then to liquefy the excess gas and return it to the liquid storage container 21.

The means for accomplishing this result are constructed as follows:

200 represents a pressure controlled switch which is responsive to pressures in the liquid storage tank 21 and which is closed when the pressure in the liquid storage tank reaches the maximum. This switch connects with a conductor 201 leading to a manually operable three-way selector switch 202. When the movable switch member is in engagement with the stationary contact 203, the pressure relief cycle will be operated automatically. When this manually controlled switch 202 engages the contact 204, the pressure relief mechanism will be operated manually, and if the movable switch member is in an intermediate position between these two contacts, the pressure relief mechanism will be inoperative.

Assuming that the switch member 202 engages contact 203, a circuit will be closed including a conductor 205 from which a branch conductor leads to a solenoid 207 of a relay having two movable circuit closing members 210 and 211. When the solenoid 207 is energized, the movable contact member 211 will complete a circuit to a conductor 212, through a thermostatically controlled contact switch 214. The thermostat or other temperature responsive device which controls the switch 214 should be so located as to be acted upon by the fermentation gas leaving the heater 104, so that the switch 214 will be closed when temperature of this gas leaving the heater is below that desired, and the switch will be closed and when this temperature is in excess of that desired, the switch will be opened. If the gas temperature decreases sufficiently to close the thermostatic switch 214, then a relay 215 will be energized which also has two circuit closing devices 216 and 217, thus closing a circuit to an electric heating unit 218 arranged in the heater 104. Since the circuit through the gas heater is at higher voltage than the control circuit, the heat circuit is not completely shown, it being understood, however, that this circuit is connected to the terminals 220 and 221, which when contacted by the movable contact members 216 and 217 will supply current to the heater in accordance with the action of the thermostatically controlled switch 214.

When the solenoid 207 is energized and the movable contact member 210 is in circuit closing position, current will be supplied to a conductor 223 leading to a pilot light 224 which indicates when the pressure relief cycle is in operation, and to a solenoid 116 which controls the three-way valve 115 for admitting control or actuating gas through pipe 117 to the diaphragm of valve 118, which is opened when control gas acts on the diaphragm of this valve. A heating element 245 warming the valve 118 also is energized when contact member 210 is in circuit closing position. When this valve is open, gas from the head of the liquid storage tank 21 will be passed through the heater 104 and reducing valve 106 back to the vapor storage tanks 20. This results in reducing the pressure within the liquid storage receiver 21. When the pressure relief cycle is in operation, the pressure in the vapor storage tanks 20 may increase to the upper limit of its range of pressures, thus causing the liquefaction cycle to become actuated through the pressure switch 150. However, because of the connections described, the liquefaction cycle cannot become operative unless the fermentation gas compressor is operating. If the pressure in the receiver 8 is too low to cause the compressor 9 to operate, then the liquefaction can, of course, not take place. To take care of this emergency another pressure controlled switch 230 is provided which is responsive to pressure in the vapor storage tank 20 and which is closed when the pressure in these tanks rises slightly above the maximum of the range of pressures to which these tanks are normally subjected, for example, at a pressure of 182 pounds per square inch. When this pressure switch 230 is closed a circuit is completed including the solenoid 126 which controls a three-way valve 125 and which, when energized, will supply control fluid to the diaphragm 134 of the valve 127. This will permit fermentation gas to pass through the reducing valve 134 and through pipe 135 to the receiver 8. When the required pressure is obtained in the receiver 8, the compressor 9 will operate as heretofore described. Gas from the receiver 8 will then be compressed and pass to the liquefaction condenser. The liquefied fermentation gas will pass into the liquid storage container 21 and this operation will continue until the pressure in the liquid storage tank 21 is reduced to the maximum pressure at which it is intended to operate, for example, 250 pounds per square inch. The liquefaction cycle will then continue to operate until the pressure in the vapor storage tank 20 is reduced to the low pressure of its pressure range, for example, 170 pounds per square inch. When the pressure in the vapor storage tank 20 is reduced to a predetermined point, such, for example, as 172 pounds per square inch, the pressure switch 230 will be opened, thus stopping the pressure relief cycle.

*Low liquid pressure make-up in liquid receiver*

In the event that the pressure in the liquid storage receiver 21 is reduced to a predetermined low point, which may for example be about 225 pounds per square inch with carbon dioxide, then a pressure controlled switch 235, responsive to pressure in the liquid receiver will be moved into circuit closing position. This pressure controlled switch 235 is connected in the circuit in parallel with the vapor pressure controlled switch 150. If the pressure switch 150 is already closed, then the liquefaction cycle will be in operation. The necessary step for increasing the pressure in the liquid receiver is in progress and the closing of the switch 235 will have no further effect. If, however, the pressure switch 150 is open because of low pressure in the vapor storage, then the closing of the switch 235 will start the liquefaction cycle, unless the vapor storage pressure has previously been reduced to the low point of its range of pressure, for example, 160 pounds per square inch so that the pressure switch 180 is closed to cause the evaporation cycle to start. In that event, the solenoid 182 would be energized, thus moving the movable contact member 183 upwardly to break the circuit through the pressure switch 235 and also in parallel with the switch 150, thus breaking the liquefaction circuit.

However, if there is no demand for evaporation and all of the gas from the fermentation gas compressors is passed through the liquefaction condenser into the liquid receiver 21 and will continue to do so until the pressure in the receiver 21 builds up to approximately 250 pounds per square inch. This phase of the operation is only interrupted if there is a demand from the vapor storage tanks 20 for evaporation of liquid fermentation gas if the pressure in the vapor storage tank falls below the low pressure in the range of pressures, for example, 160 pounds per square inch. At such times not only will the liquefaction phase be stopped, but gas from the fermentation gas compressors will pass directly to the vapor storage, since the valve 34 will be energized.

The apparatus described may be operated manually by means of the three manually operated selector switches 190, 194 and 202. For example, if it is desired to condense all vapor collected from the fermenter, then it is only necessary to place the selector switch 190 into position for manual operation, namely, into engagement with the stationary contact 192 and the selector switch 194 into an intermediate position between the two contacts 198 and 199. Condensation of fermentation gas will then take place continuously until the switches are again returned to either their "off" positions or their automatic positions.

If it is necessary to quickly obtain vapor in the vapor storage tanks 20, then it is only necessary to place the movable switch member 194 into engagement with the fixed terminal 199, whereupon evaporation will take place and continue to do so until the movable switch member 194 is moved either into the "off" or automatic position.

If it is necessary to reduce the pressure in the liquid receiver tank 21, then the selector switch 202 can be put into contact with the terminal 204 whereupon the vapor in the head space of the liquid receiver 21 will be returned to the vapor storage tank 20. It may be desirable at times to operate this phase manually in order to quickly make up vapor requirements at the vapor storage receiver 20.

All phases of the system may be cut out by putting any one or all of the manually operable selector switches into the "off" position.

240 represents a hand-operated blow-off valve which may be opened at intervals to permit any air to be discharged from the liquid storage tank 21, and 241 represents a hand-operated valve through which liquid or sediment collected in the bottom of the storage tank 21 may be drained.

A number of hand-operated valves in addition to those specifically referred to are shown in the drawings, and it will be obvious that these valves may be employed for the purpose of manually interrupting the flow of gases and liquids in certain parts of the apparatus for cleaning, maintenance or repair of such parts. Also check valves, in addition to those herein referred to, may be applied to the apparatus wherever necessary.

The liquid storage container 21 should be well heat insulated and kept in a cold room, as has heretofore been customary. By maintaining the vapor storage at a lower pressure than the liquid storage, there will be no difficulty in transferring vapor from liquid storage, either by the blow off or by evaporation, to the vapor storage.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. Apparatus for handling fermentation gas including a compressor for compressing said gas, a storage tank for said gas in vapor phase, a condenser cooled by a refrigerant and in which said compressed gas is liquefied, a receiver for liquefied gas, a valve controlling the passage of compressed gas to said vapor storage tank, a second valve controlling the passage of compressed gas to said condenser, and a pressure responsive device responsive to pressures in said vapor storage tank which affects closing said second valve and opening said first valve when the pressure in said vapor storage tank is less than the maximum desired pressure and which affects closing said first valve and opening said second valve when the pressure in said vapor storage tank is below said desired maximum, whereby only compressed gas in excess of that required in said vapor storage tank is liquefied.

2. Apparatus according to claim 1, and including a heating device for vaporizing liquid fermentation gas, a conduit which conducts said vapor to said vapor storage tank, and a pressure responsive device responsive to pressure in said vapor storage tank when the same falls below the minimum pressure desired therein for actuating said vaporizing means.

3. Apparatus for handling fermentation gas including a compressor for compressing said gas, a storage tank for said gas in vapor phase, a condenser cooled by a refrigerant and in which said compressed gas is liquefied, a receiver for liquefied gas, a pressure actuated electric switch responsive to pressure in said vapor storage tank, a solenoid actuated valve, electrical connections between said switch and solenoid for conducting electric current from said switch to the solenoid of said valve, and flow control devices actuated by said valve for supplying compressed vapor to said vapor storage tank when the pressure therein is below the desired maximum and for interrupting the supply of compressed gas to said vapor storage tank and directing gas to said condenser when the pressure in said vapor storage tank reaches the desired maximum, whereby a constant supply of compressed gas is maintained in said vapor storage tank.

4. Apparatus for handling fermentation gas including a compressor for compressing said gas, a storage tank for said gas in vapor phase, a condenser cooled by a refrigerant and in which said compressed gas is liquefied, a receiver for liquefied gas, a pressure actuated electric switch responsive to pressure in said vapor storage tank, a solenoid actuated valve, electrical connections between said switch and solenoid for conducting electric current from said switch to the solenoid of said valve, flow control devices actuated by said valve for supplying compressed vapor to said vapor storage tank when the pressure therein is below the desired maximum and for interrupting the supply of compressed gas to said vapor storage tank and directing gas to said condenser when the pressure in said vapor storage tank reaches the desired maximum, whereby a constant supply of compressed gas is maintained in said vapor storage tank, mechanism for starting a refrigerant compressor to supply refrigerant to said condenser, and connections between said switch and said mechanism for actuating said mechanism.

5. Apparatus for handling fermentation gas including a compressor for compressing said gas, a storage tank for said gas in vapor phase, a condenser cooled by a refrigerant and in which said compressed gas is liquefied, a receiver for liquefied gas, a pressure actuated electric switch responsive to pressure in said vapor storage tank, a solenoid actuated valve, electrical connections between said switch and solenoid for conducting electric current from said switch to the solenoid of said valve, flow control devices actuated by said valve for supplying compressed vapor to said vapor storage tank when the pressure therein is below the desired maximum and for interrupting the supply of compressed gas to said vapor storage tank and directing gas to said condenser when the pressure in said vapor storage tank reaches the desired maximum, whereby a constant supply of compressed gas is maintained in said vapor storage tank, mechanism for starting a refrigerant compressor to supply refrigerant to said condenser, said mechanism including an electric circuit, and means for completing said circuit only when said first mentioned compressor is in operation.

6. Apparatus for handling fermentation gas including a receiver for said gas at low pressure, a compressor having its inlet connected with said receiver and for compressing the gas, a storage tank for compressed gas in vapor phase and normally connected with the discharge of said compressor, a condenser cooled by a refrigerant, a container for liquefied fermentation gas discharged from said condenser, a switch responsive to pressures in said low pressure receiver, a circuit closed by said switch for starting the operation of said refrigerant gas compressor, a second switch responsive to pressure in said vapor storage tank, a relay moved into circuit closing position when said first mentioned switch closes the circuit for starting said gas compressor, a second circuit including said relay and including means for closing said second circuit when said second switch is closed and said relay is in circuit closing position, and control means actuated by said second circuit for passing compressed gas from said compressor to said condenser when pressure in said vapor storage tank reaches the desired maximum.

7. Apparatus according to claim 6, and including a third circuit closed when said second switch is closed, and means actuated by said third circuit for admitting refrigerant to said condenser.

8. Apparatus according to claim 6 and including a third circuit closed when said second switch is closed, a refrigerant compressor for discharging refrigerant to said condenser, and means actuated by said third circuit for starting the operation of said compressor.

9. Apparatus according to claim 6 and including a third circuit closed when said second switch is closed, a refrigerant compressor for discharging refrigerant to said condenser, and driven by an electric motor, means actuated by said third circuit for starting said motor, and a device actuated when said motor is overloaded for moving said relay into circuit opening position to interrupt actuation of said control means and to stop the passage of compressed gas to said condenser.

10. Apparatus for handling fermentation gas including a compressor for compressing said gas, a storage tank for compressed gas in vapor phase, a condenser cooled by a refrigerant, a container for liquefied fermentation gas discharged from said condenser, a pressure controlled switch responsive to pressures in said vapor storage tank and which is closed when pressure in said storage tank is reduced to a predetermined point, an evaporator for liquefied gas, means including valves and operating devices therefor operated by said switch for simultaneously admitting liquefied gas to said evaporator and applying heat thereto, said switch being opened for interrupting the supply of liquefied gas and the application of heat to said evaporator when the pressure in said vapor storage tank rises to a predetermined point.

11. Apparatus according to claim 10, in which said evaporator is of tubular form of inverted U-shape and in which liquefied fermentation gas is admitted to one leg thereof, and level control means controlling the supply of liquefied gas to said leg of said evaporator.

12. Apparatus according to claim 10, in which said evaporator is of double tube construction with one tube arranged within the other, the liquefied gas being admitted to one of said tubes and the heating medium in vapor form being admitted to the other tube, and means responsive to the temperature of the heating medium leaving the evaporator for controlling the admission of heated vapor to said evaporator.

13. Apparatus according to claim 10, in which said evaporator is of double tube construction with one tube arranged within the other, the liquefied gas being admitted to one of said tubes, means for supplying steam to the other of said tubes, and a valve controlling the admission of steam to said evaporator and responsive to the temperature of the condensate leaving the evaporator to admit more steam when the temperature of the condensate drops to a predetermined point and to decrease the amount of steam when the temperature of the condensate rises to a predetermined point.

14. Apparatus according to claim 10 and including a conduit for conducting vaporized refrigerant to said vapor storage tank.

15. Apparatus for handling fermentation gas including a compressor for compressing said gas, a storage tank for compressed gas in vapor phase, a condenser cooled by a refrigerant, a container for liquefied fermentation gas discharged from said condenser, mechanism responsive to pressures in said vapor storage tank and including conduits and valves which direct compressed gas to said condenser when the pressure in said vapor storage tank exceeds that desired, an evaporator for liquefied gas, and a low pressure responsive device connected with said vapor storage tank and which admits liquefied gas to said evaporator and which renders said mechanism inoperative.

16. Apparatus for handling fermentation gas including a receiver for said gas at low pressure, a compressor having its inlet connected with said receiver and for compressing the gas, a storage tank for compressed gas in vapor phase and normally connected with the discharge of said compressor, a condenser cooled by a refrigerant, a container for liquefied fermentation gas discharged from said condenser, mechanism responsive to pressures in said vapor storage tank and including valves, one of which is normally open when pressure in said storage tank is low to admit gas from said compressor to said vapor storage tank and which is closed by said mechanism when said pressure reaches the desired maximum, the other of said valves being normally closed and being opened by said mechanism when said first valve is closed, to admit compressed gas to said condenser for delivery in liquid phase to said liquid container, an evaporator for liquefied gas, and other mechanism responsive to a still lower pressure in said vapor storage tank and which renders said first mechanism inoperative and supplies liquefied gas to said evaporator for transfer to said vapor storage tank.

17. Apparatus for handling fermentation gas including a receiver for said gas at low pressure, a compressor having its inlet connected with said receiver and for compressing the gas, a storage tank for compressed gas in vapor phase and normally connected with the discharge of said compressor, a condenser cooled by a refrigerant, a container for liquefied fermentation gas discharged from said condenser, mechanism responsive to pressures in said vapor storage tank and including valves, one of which is normally open when pressure in said storage tank is low to admit gas from said compressor to said vapor storage tank and which is closed by said mechanism when said pressure reaches the desired maximum, the other of said valves being normally closed and being opened by said mechanism when said first valve is closed, to admit compressed gas to said condenser for delivery in liquid phase to said liquid container, a valve controlled passage connecting the upper portion of said liquid storage container and delivering vapor from said container to said vapor storage tank when the pressure in said liquid container becomes excessive, and another valve controlled passage connecting said vapor storage tank with said receiver when the pressure in said vapor storage tank becomes excessive, whereby gas discharged from said vapor storage tank is again liquefied and returned to said liquid storage container.

18. Apparatus for handling fermentation gas including a receiver for said gas at low pressure, a compressor having its inlet connected with said receiver and for compressing the gas, a storage tank for compressed gas in vapor phase and normally connected with the discharge of said compressor, a condenser cooled by a refrigerant, a container for liquefied fermentation gas discharged from said condenser, mechanism responsive to pressures in said vapor storage tank and including valves, one of which is normally open when pressure in said storage tank is low to admit gas from said compressor to said vapor storage tank and which is closed by said mechanism when said pressure reaches the desired maximum, the other of said valves being normally closed and being opened by said mechanism when said first valve is closed, to admit compressed gas to said condenser for delivery in liquid phase to said liquid container, a pressure controlled switch which is closed when pressure in said liquid container falls below a desired minimum, and means controlled by said switch to actuate said mechanism to supply compressed gas to said condenser.

FRANCIS A. CRAIG.

References Cited in the file of this patent

UNITED STATES PATENTS

| Number | Name | Date |
| --- | --- | --- |
| 518,361 | Zwietusch | Apr. 17, 1854 |
| 2,082,189 | Twomey | June 1, 1937 |
| 2,239,485 | Markus et al. | Apr. 22, 1941 |
| 2,333,154 | Markus et al. | Nov. 2, 1943 |
| 2,601,764 | Collins et al. | July 1, 1952 |